United States Patent
Yu et al.

(10) Patent No.: US 7,492,727 B2
(45) Date of Patent: Feb. 17, 2009

(54) SPACE AND TIME EFFICIENT XML GRAPH LABELING

(75) Inventors: Philip S. Yu, Chappaqua, NY (US); Haixun Wang, Irvington, NY (US); Hao He, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 11/396,502

(22) Filed: Mar. 31, 2006

(65) Prior Publication Data

US 2007/0230488 A1 Oct. 4, 2007

(51) Int. Cl.
*H04L 12/28* (2006.01)
(52) U.S. Cl. .................... 370/255; 370/400; 370/408
(58) Field of Classification Search ............ 370/254, 370/255, 256, 395.32, 400, 408
See application file for complete search history.

(56) References Cited

U.S. PATENT DOCUMENTS 7,362,974 B2 * 4/2008 De Patre et al. .............. 398/50
2006/0034194 A1 * 2/2006 Kahan ...................... 370/255

OTHER PUBLICATIONS

Schmidt, A., et al., Xmark: A Benchmark for XML Data Management, *Proceedings of the 28th VLDB Conference*, (pp. 1-12), Hong Kong, China, 2002.

Cohen, E., et al., Reachability and distance queries via 2-hop labels, *Proceedings of the 13th Annual ACM-SIAM Symposium on Discrete Algorithms*, (pp. 937-946), 2002.

Keseler, I., et al., EcoCyc: a comprehensive database resource for *Escherichia coli*, Nucleic Acids Research, V.33, Database issue, (pp. D334-D337), 2005.

Romero, P., et al., Computational prediction of human metabolic pathways from the complete human genome, *Genome Biology*, vol. 6(1) Article R2 (pp. 1-17), Dec. 2004.

Schenkel, R., et al., Efficient Creation and Incremental Maintenance of the HOPI Index for Complete XML Document Collections, *Proceedings of the 21st International Conference on Data Engineering*, ICDE 2005, (pp. 1-12) in 2005 IEEE.

* cited by examiner

*Primary Examiner*—Chirag G Shah
*Assistant Examiner*—Minh-Trang Nguyen
(74) *Attorney, Agent, or Firm*—Alison D. Mortinger; Jeffrey N. Giunta; Fleit Gibbons Gutman Bongini & Bianco P.L

(57) ABSTRACT

There is provided a method for determining reachability between any two nodes within a graph. The inventive method utilizes a dual-labeling scheme. Initially, a spanning tree is defined for a group of nodes within a graph. Each node in the spanning tree is assigned a unique interval-based label, that describes its dependency from an ancestor node. Non-tree labels are then assigned to each node in the spanning tree that is connected to another node in the spanning tree by a non-tree link. From these labels, reachability of any two nodes in the spanning tree is determined by using only the interval-based labels and the non-tree labels.

1 Claim, 6 Drawing Sheets

SPACE AND TIME EFFICIENT XML GRAPH LABELING

STATEMENT REGARDING FEDERALLY SPONSORED RESEARCH OR DEVELOPMENT

This invention was made with Government support under Contract No. H98230-04-3-001 awarded by the U.S. Department of Defense. The Government has certain rights in this invention.

BACKGROUND OF THE INVENTION

1. Field of the Invention

This invention relates in general to reachability between two vertices in a graph, and more particularly to generation and efficient storage of information pertaining to the existence of a path between a set of vertices, but not the exact path.

2. Description of the Related Art

Knowing the existence of a path that connects one node in a network to a second node in a network is fundamental to a wide range of applications, including XML indexing, geographic navigation, internet routing, ontology queries based on the Resource Description Framework (RDF)—a family of specifications for a metadata model that is often implemented as an application of XML, ontology queries based on Web Ontology Language (OWL)—a markup language for publishing and sharing data using ontologies on the Internet, and many others. For example, for XML documents, reachability queries are the most basic operation in performing join and other advanced queries, which means fast processing is mandatory. Thus, it is of great importance that reachability queries can be carried out in an efficient way.

Given an n-vertex, m-edge directed graph, there are currently two basic approaches to handle reachability queries. One is to use a single-source shortest path algorithm; that is, for any two vertices, the shortest path algorithm is used to determine if they are connected. This approach may take $O(m)$ query time, but requires no extra data structure besides the graph itself for answering reachability queries. In this description, the $O(x)$ function represents the order of something, such as processing or storage, relative to the parameter "x". Another approach is to compute and store the transitive closure of the graph. It answers reachability query in constant time but needs $O(n^2)$ space to store the transitive closure of an n-vertex graph. Many applications involve massive graphs, yet require fast answering of reachability queries. Such considerations make the basic approaches unattractive.

Several approaches have been proposed to encode graph reachability information using vertex labeling schemes. A labeling scheme assigns labels to vertices in the graph, and it answers reachability queries by comparing the labels of the vertices.

Although interval-based labeling is best for tree structures, reachability queries may take $O(m)$ time using the interval-based approach for graphs. One known method proves that, for sparse graphs, a sophisticated graph labeling method, called 2-hop, can answer reachability queries efficiently (although not in constant time) using much less storage. This result is significant because massive graphs typically are sparse. However, 2-hop labeling itself may incur a tremendous amount of computation cost. For instance, XML documents are actually a form of graphs, as they contain reference links. The 2-hop labeling approach efficiently cannot handle XML graphs, as they require exponential label sizes as the graph size increases. Each 2-hop label has an average length $O(m^{1/2})$, which means answering reachability queries requires $O(m^{1/2})$ comparisons. In at least one instance, it took a 64-bit processor, 80-Gb memory Sun server more than 45 hours to label the well-known DBLP dataset using the 2-hop method. Clearly, in practice, such labeling methods cannot be used for massive graphs. Therefore, the labeling process is often too time-consuming to be practical.

In general, labeling can be a costly process in terms of time and is impractical for massive graphs. Accordingly, a need exists to overcome the difficulties with determining reachability between two given nodes in a sparse graph of large size.

SUMMARY OF THE INVENTION

Briefly, in accordance with the present invention, disclosed is a system and method for determining node reachability within a graph. In one embodiment, the method includes assigning a combination of interval based labels and non-tree labels to a set of nodes within a graph. The invention is then able to indicate reachability through a non-tree link from a first node to a second node within the graph based at least in part on data contained in the non-tree labels.

In one embodiment of the present invention, a non-tree label is assigned to each node in the graph that is connected to another node in the graph by a non-tree link.

In another embodiment of the present invention, the interval-based label specifies a start and an end, where the start is the node's preorder number and the end is one less than the node's postorder number in the graph.

In still another embodiment of the present invention, the graph is initially defined so as to minimize a number of non-tree edges.

In one embodiment of the present invention, a depth-first traversal of the graph is performed to define unique interval labels for each respective node in the graph and the unique interval-based labels are then assigned to each respective node within the graph In other embodiments of the present invention, a table of non-tree links listing each non-tree link between nodes in the graph is created and a transitive closure of the link table is created, wherein the output is determined based at least in part on data within the link table.

An embodiment of the present invention compares the labels of any set of two of the nodes in the graph and determines reachability between the two nodes in the set in constant time by utilizing the transitive closure of the link table.

One embodiment of the present invention adds a link $i_1 \rightarrow [j_2, k_2)$ to a transitive link table if $i_2 \in [j_1, k_1)$ for any two links $i_1 \rightarrow [j_1, k_1)$ and $i_2 \rightarrow [[j_2, k_2)$ in the link table.

Embodiments of the present invention compute a transitive link counting function with a first parameter and a second parameter, where the function specifies a number of specified links. Each respective specified link has a respective source node identifier greater than the first parameter and a respective destination with a spanning range encompassing the second parameter. It is then determined whether the first node is reachable from the second node by determining if the difference between a first transitive link counting function with a first parameter pair and a second transitive link counting function with a second parameter pair is greater than zero, wherein a first parameter of the first parameter pair is set to a preorder of the first node, a first parameter of the second parameter pair is set to the adjusted post order of the first node and the second parameter of the first parameter pair and the second parameter of the second parameter pair is set to a preorder of the second node.

In an additional embodiment of the present invention, a number of entries in the transitive link table is reduced by removing transitive links that are not located at grid points that correspond to $\{i|i\rightarrow[j, k)\in T\}\times\{j|i\rightarrow[j, k)\in T\}$, where T is the transitive link table.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

I. Overview

Figure 1:
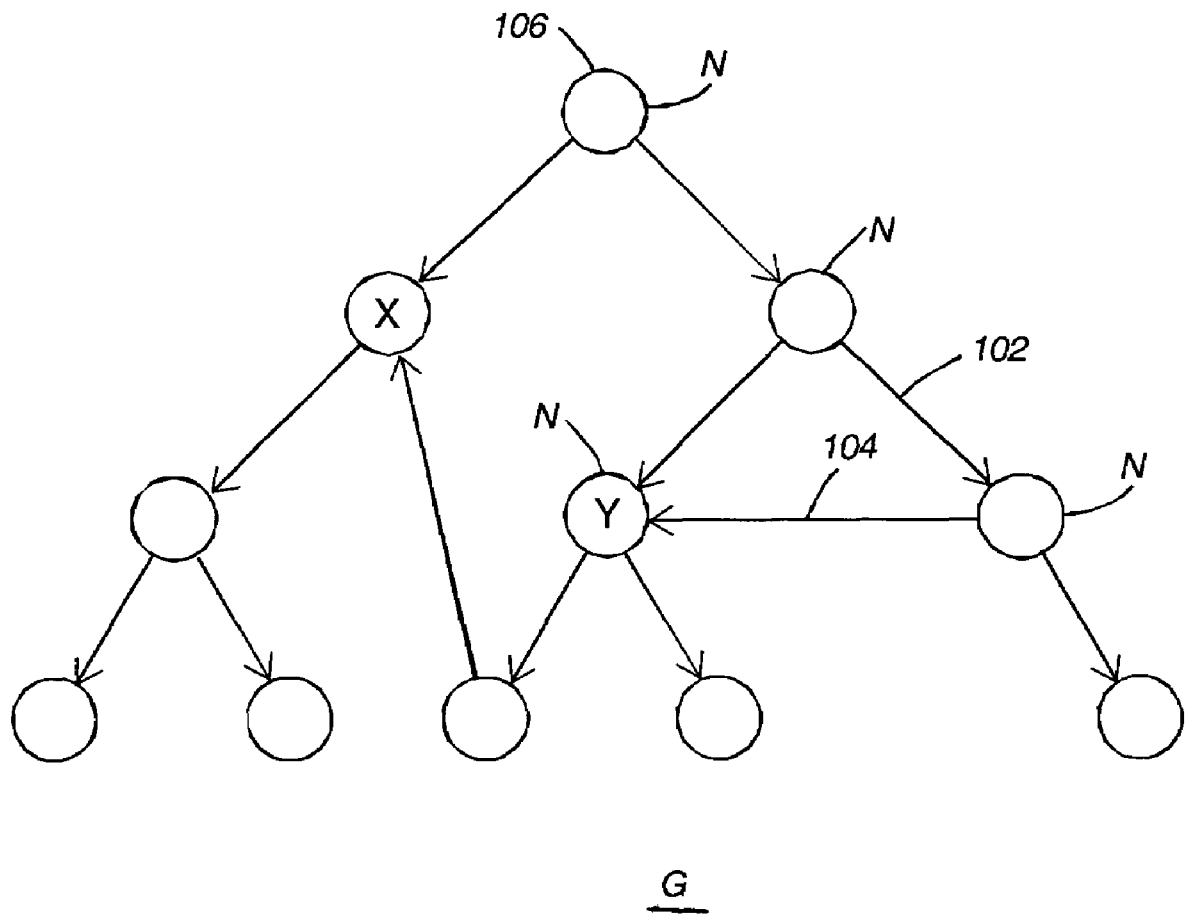
FIG. 1 is a diagram illustrating a spanning tree graph having a set of tree edges and a set of non-tree edges that span between vertices according to an embodiment of the present invention.

It should be understood that the embodiments described below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

As a basis for the concepts and theories discussed below, reference is made to the following publications. The contents and teachings of: Edith Cohen, Eran Halperin, Haim Kaplan and Uri Zwick, "Reachability and distance queries via 2-hop labels," in "Proceedings of the 13$^{th}$ Annual ACM-SLIM Symposium on Discrete Algorithms, pp 937-945, 2002; I. M. Keseler, J. Collado-Vides, S. Gama-Castro, J. Ingraham, S. Paley, I. T. Paulsen, M. Peralta-Gil, and P. D. Karp, "Ecoeye: A comprehensive database resource for *Escherichia coli*," Nucleic Acids Research, 33 (D334-D337), 2005; P. Romero, J. Wagg, M. L. Green, D. Kaiser, M. Krummenacker, and P. D. Karp, "Computational Prediction of human metabolic pathways from the complete human genome," Genome Biology, 6(1):1-17, 2004; and R. Schenkel, A Theobald, and G. Weikum, "Efficient creation and incremental maintenance of the HOPI index for complex xml document collections," ICDE, 2005, are hereby incorporated herein by reference.

Embodiments of the present invention provide a novel labeling scheme for sparse graphs. The present invention ensures that graph reachability queries can be answered in constant computational time that is not dependant on the size of the graph. Furthermore, for sparse graphs, the complexity of the labeling process of the present invention is substantially linear with respect to the size of the graph, which improves the applicability of the algorithm to massive datasets. Analytical and experimental results show that the present inventive approach is much more efficient than currently-used approaches. Furthermore, the present labeling method also provides an alternative scheme to tradeoff query time for label space, which further benefits applications that use tree-like graphs.

Embodiments of the present invention provide a novel labeling scheme for handling reachability queries for massive, sparse graphs. The invention optimizes both query time and labeling time and consists of two schemes, referred to herein as "Dual-I" and "Dual-II." The Dual-I labeling scheme has constant query time, and for sparse graphs, the labeling complexities of both Dual-I and Dual-II are almost linear. The Dual-II scheme has higher query complexity but uses less memory space. Table 1 compares the dual labeling approach of the present invention with existing approaches.

TABLE 1

|  | Query time | Index time | Index size |
| --- | --- | --- | --- |
| Shortest Path | O(m) | 0 | 0 |
| Transitive Closure | O(1) | $O(n^3)$ | $O(n^2)$ |
| Interval | O(n) | O(n) | $O(n^2)$ |
| 2-Hop | $O(m^{1/2})$ | $O(n^4)$ | $O(nm^{1/2})$ |
| HOPI | $O(m^{1/2})$ | $O(n^3)$ | $O(nm^{1/2})$ |
| Dual-1 | O(1) | $O(n + m + t^3)$ | $O(n + t^2)$ |
| Dual-11 | O(log t) | $O(n + m + t^3)$ | $O(n + t^2)$ |

The present approach considers a tree graph G, as shown in FIG. 1. Graph G is referred to as a tree graph because it has downward branching arm, starting from the uppermost node 106. Graph G has two components: a set of n−1 tree edges 102 that span between vertices n that are in a descending tree-type structure, plus a set of t non-tree edges 104, that extend between two branches in the tree structure. For sparse, tree-like graphs, it can be assumed that t<<n.

The tree edges 102 and non-tree edges 104, together contain the complete reachability information of the original graph. The dual labeling scheme seamlessly integrates i) interval-based labels, which encode reachability in the spanning tree via linear branches, and ii) non-tree labels, which encode additional reachability in the remainder of the graph, via branch-to-branch jumping. At query time, the invention first consults the interval-based labels (explained below) to see if two nodes are connected solely by tree edges 102; if not, non-tree labels (explained below) are explored to see if the nodes are connected by paths that involve non-tree edges 104. This second type of path does not necessarily consist exclusively of non-tree edges, but can also include tree edges as well.

For Dual-I, both operations have constant time complexity. For Dual-II, the second operation takes O(log t) time. Since t<<n for sparse graphs, O(log t) is often reasonable or even negligible. Furthermore, the two sets of labels can be assigned by depth-first traversal of the graph, which is of linear complexity. The preprocessing step may take $O(t^3)$ time in the worst case. However, as is shown below, this cost is often reasonable and sometimes almost negligible for sparse graphs. To check reachability encoded by non-tree labels, the Dual-1 approach uses an additional data structure of size $t^2$. Since the spanning tree of a connected graph has n−1 edges, the number of non-tree edges t is at most m−n+1. The present invention introduces a tradeoff between processing time and storage space. By paying a negligible cost of O(log t) in query time, the Dual-II scheme manages to use much less space for query processing. Although in the worst case the space requirement for Dual-II is still $O(n+t^2)$, in practice the space requirement is much less.

It is now clear that t, the number of non-tree edges, is a performance factor in the present approach. As is shown below, t can be reduced without losing reachability information in the original graph if the spanning tree is chosen carefully. In fact, if spanning trees are found in the minimal equivalent graph of the original graph, t can be minimized, thus further improving query and indexing performance.

II. Dual Labeling

This section presents the dual labeling approach. The input is a directed graph G=(V, E) where |V|=n and |E|=m. It is assumed that the graph is acyclic. If the graph is not acyclic, "strongly connected" components of G are found and each component is collapsed into a representative node. Strongly connected components are the maximal subgraph in which every vertex is reachable from every other vertex. Clearly, all of the nodes in a strongly connected component are equivalent to its representative node as far as reachability is concerned. Collapsing strongly connected components into representative nodes takes O(n+m) time using Tarjan's algorithm. Tarjan's algorithm is used for symmetrically permuting a given matrix to block triangular form. Then, a spanning tree in the graph is found, and interval-based labels and non-tree labels are assigned to each node in the graph. The complexity of assigning dual labels is substantially close to linear for sparse graphs, and the Dual-I labeling scheme answers reachability queries in O(1) time.

A. Non-Tree Edges and Transitive Link Table

A preliminary step in the present invention is to define a spanning tree G in a particular graph so that interval-based labels can be assigned to the nodes n of the graph. The non-tree edges 104 are also tracked during this step of the exemplary embodiment so that the reachability information is complete. Note that the choice of the spanning tree has an impact on the number of non-tree edges that must keep track of.

Again referring to FIG. 1, the graph G demonstrates the problem at hand. In graph G, there are two nodes, x and y, whose "in-degrees" (number of edges to get from y to x) are greater than 1. Because traversal of a non-tree edge optimizes the path from y to x, we are prevented from directly applying interval-based labeling (explained below) to G.

Figure 2:
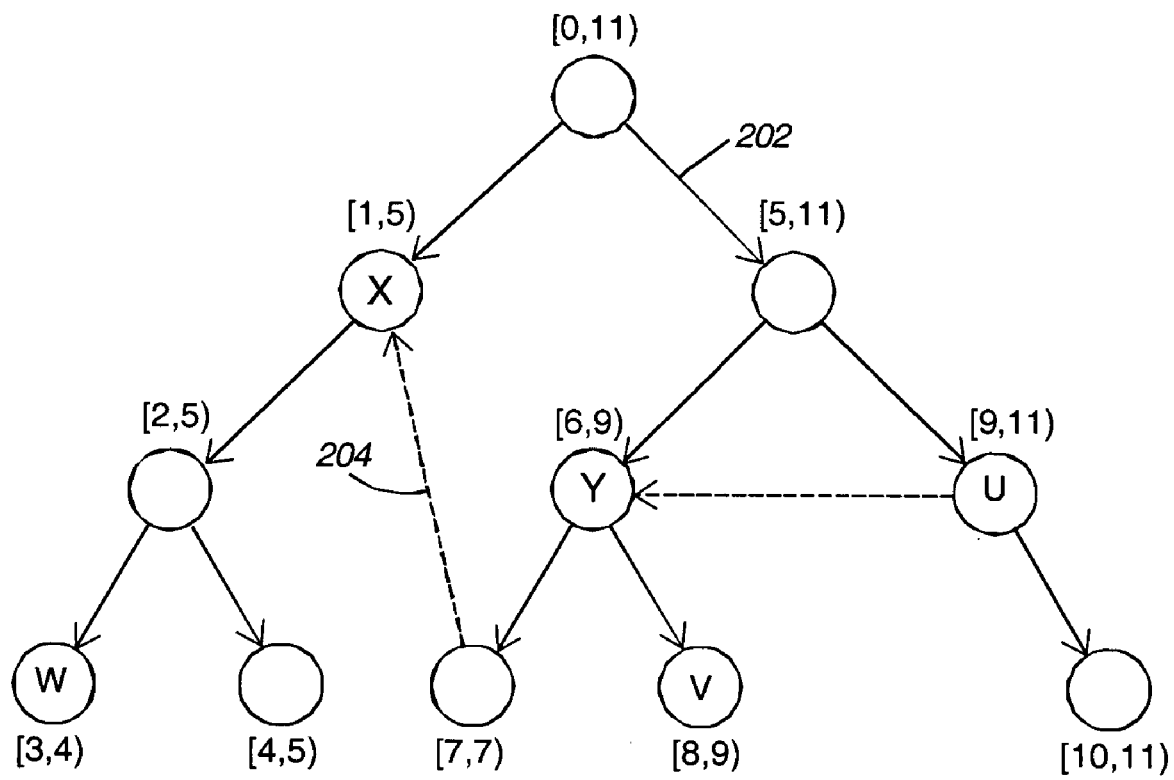
FIG. 2 is a diagram illustrating the spanning tree graph of FIG. 1 with interval-based labels according to an embodiment of the present invention.

In an embodiment of the present invention, a spanning tree T is found in G. Referring now to FIG. 2, the solid lines represent the edges 202 of the spanning tree T, and the dotted lines are non-tree edges 204 and are not included in the spanning tree T. We assign an interval-based label [start, end) to each node n, where start and end−1 are u's preorder and post-order number respectively (with regard to the spanning tree). Preorder traversal is defined recursively as follows. To do a preorder traversal of a general tree:

1. Visit the root first; and then 2. do a preorder traversal to each of the subtrees of the root one-by-one in the order given.

For a binary tree, the pre-oder traversal is as follows:

1. Visit the root first; and then 2. traverse the left subtree; and then 3. traverse the right subtree.

In contrast with preorder traversal, which visits the root first, postorder traversal visits the root last. To do a postorder traversal of a general tree:

1. Do a postorder traversal each of the subtrees of the root one-by-one in the order given; and then 2. visit the root.

To do a postorder traversal of a binary tree

1. Traverse the left subtree; and then 2. traverse the right subtree; and then 3. visit the root.

For instance, with respect to the nodes u and v, if the preorder number of node v is inside the range of [start, end), then v is u's descendant in the spanning tree.

The reachability information contained in graph G and T are not the same. Thus, in addition to the tree T, we must also keep track of the non-tree edges 204. If there is a non-tree edge 204 from a node labeled [a, b) to a node labeled [c, d), then the edge is recorded in a link table. This link is denoted by:

a→[c, d).

It should be noted that if c∈[a, b), which means that node [c, d) is already reachable from node [a, b) via one or more tree edges, then any non-tree edge between the two is superfluous, and there is no need to keep track of it. Below, it is shown how input graphs can be preprocessed to remove superfluous edges so that the number of non-tree edges that need to be stored in the link table is minimized.

By combining interval-based labels and the link table containing non-tree edges, complete reachability information of the graph is obtained, as the following lemma indicates.

Lemma 1. Assume two nodes u and v are labeled [a, b) and [c, d) respectively. There is a path from u to v iff c∈[a, b) or the link table contains a series of m non-tree edges $$i_1 \to [j_1, k_1), K, i_m \to [j_m, k_m) \qquad [\text{Equation 1}]$$

such that $i_1 \in [a,b), c \in [j_m, k_m)$, and $i_m \in [j_{m'-1}, k_{m'-1})$ for all $1 \langle m' \leq m$.

Proof: Interval-based labeling guarantees c∈[a, b) is the necessary and sufficient condition of the existence of a tree path between node [a, b) and [c, d). If a path from u to v contains m non-tree links, then the path can be expressed in the form of Eq. 1. On the other hand, if a series of non-tree links is given as Eq. 1, then because $i_1 \in [a,b), c \in [j_m, k_m)$, and $i_m m [j_{m'-1}, k_{m'-1})$ for all $1 \langle m' \leq m$, it is known that there is a path between [a, b) and [c, d).

As an example, looking at FIG. 2, the path from u to v involves the non-tree edge 9→[6, 9), and the path from u to w involves two non-tree edges 9→[6, 9) and 7→[1, 5). Applying Lemma 1 naïvely for answering reachability queries would involve traversing and exploring the non-tree edges in an iterative fashion, which is extremely costly. To "shortcut" this graph search, the transitive closure of the link table is calculated. That is, given two links $i_1 \to [j_1, k_1)$ and $i_2 \to [j_2, k_2)$ in the link table, if $i_2 \in [j_1, k_1)$, we add a new link $i_1 [j_2, k_2)$ to the table. This process is repeated until no new links can be added. The resulting table is referred to as a transitive link table and denoted T.

The link table corresponding to the tree of FIG. 2 contains two non-tree edges 9→[6, 9) and 7→[1,5). From this link table, a new link, 9→[1, 5), is generated. Therefore, the transitive link table consists of the following entries:

9→[6, 9)

7→[1, 5)

9→[1, 5)

Property I (Size of the Transitive Link Table)

Because the original link table has t entries, the transitive link table can have up to but no more than $$\frac{t(t+1)}{2}$$

entries.

Proof. Each entry in the link table is denoted as $L(i) \rightarrow R(i)$, where $i=1, \ldots, t$. A derived link has the form $L(i) \rightarrow R(j)$, $i \neq j$. Thus, potentially $t(t-1)$ entries can be added. Let $L(i) \rightarrow R(j)$ be a derived link. It must be derived from a series of links $L(i) \rightarrow R(i), \ldots, L(j) \rightarrow R(j')$. Then, the node represented by $L(j)$ is reachable from the node represented by $R(i)$. Because the graph does not have cycles, the potential entry $L(j) \rightarrow R(i)$ cannot be derived. This means at most, half of the entries are eligible to be added into the transitive link table.

The following theorem follows directly from Lemma 1 and the definition of the transitive link table.

Theorem 1. Assume nodes u and v are labeled [a, b) and [c, d) respectively. There is a path from u to v if and only if $c \in [a, b)$ or there exists an entry $i \rightarrow [j, k)$ in the transitive link table such that $i \in [a, b)$, and $c \in [j, k)$.

Thus, to check reachability between two nodes, the transitive link table is searched. A linear search has time complexity $O(t^2)$. Methods to reduce the search complexity to $O(1)$ are disclosed below.

B. Transitive Link Counting

Figure 3:
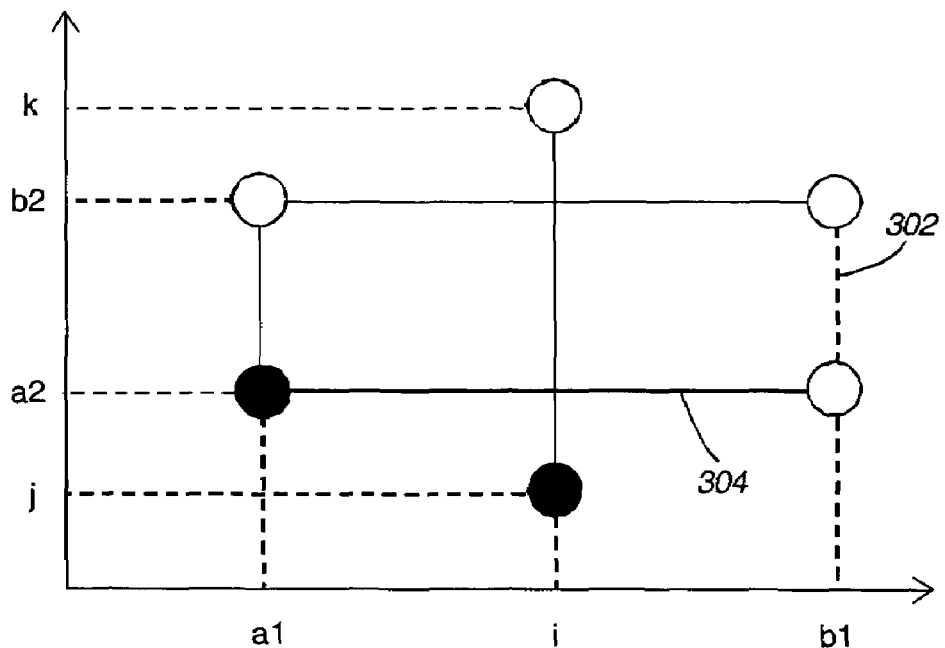
FIG. 3 is a geometric interpretation of a transitive link table according to an embodiment of the present invention.

Following the above discussion, given two nodes u and v with labels $[a_1, b_1)$ and $[a_2, b_2)$, we want to find out if there exists an entry $i \rightarrow [j, k)$ in the transitive link table such that $i \in [a_1, b_1)$ and $a_2 \in [j, k)$. FIG. 3 serves to further illustrate the problem and show the intuition behind the present inventive solution (given below).

Each link $i \rightarrow [j, k)$ in the transitive link table can be represented as a vertical line segment with i as the x coordinate and $[j, k)$ as the range of the y coordinate. The two nodes of interest, with labels $[a_1, b_1)$ and $[a_2, b_2)$, are represented as a query rectangle 302. Thus, the question of whether there exists a link $i \rightarrow [j, k)$ such that $i \in [a_1, b_1)$ and $a_2 \in [j, k)$ is tantamount to the question of whether there exists a vertical line segment that intersects (stabs through) the lower edge 304 of the query rectangle 302.

It should be noted that this is an instance of a range-temporal aggregation problem, for which a number of existing data structures with logarithmic query time are directly applicable. For now, however, the focus is on reaching O(1) query time. Fortunately, the example shown in FIG. 3 has several special properties that can be advantageously exploited for efficiency. Namely, the links in the transitive link table are not arbitrary vertical line segments, and the query rectangles are not arbitrary either; the endpoints of these objects all have coordinates corresponding to numbers used in interval labeling of a tree. These properties are exploited for efficient query processing.

A Transitive Link Count (TLC) function $N(x, y)$ computes the number of links $i \rightarrow [j, k)$ in the transitive link table that satisfy $i \geq x$ and $y \in [j, k)$. As a first cut, the TLC function $N(\cdot, \cdot)$ is defined over the two-dimensional space as follows.

In FIG. 3, the geometric interpretation of $N(a_1, a_2)$ is the number of vertical line segments intersecting the horizontal ray $x \geq a_1, y = a_2$. Similarly, $N(b_1, a_2)$ is the number of vertical line segments intersecting the horizontal ray $x \geq b_1, y = a_2$. Hence, the number of vertical line segments intersecting the lower edge of the query rectangle can be computed by $N(a_1, a_2) - N(b_1, a_2)$.

As an example, based on the transitive closure table for the graph in FIG. 2, $N(9, 3) = 1$ because there is a link $9 \rightarrow [1, 5)$ that satisfies the condition of equation 1, and $N(11, 3) = 0$ because no link satisfies the condition. The following theorem shows that, with the TLC function $N(\cdot, \cdot)$, reachability queries can be answered directly.

Theorem 2. Assume two nodes u and v are labeled $[a_1, b_1)$ and $[a_2, b_2)$ respectively, and u is not an ancestor of v in the spanning tree (i.e., $a_2 \notin [a_1, b_1)$). Node v is reachable from node u via some non-tree links if and only if:

$$N(a_1, a_2) - N(b_1, a_2) > 0. \quad \text{[Equation 2]}$$

Proof. According to equation 1, node v, labeled $[a_2, b_2)$, is reachable from node u, labeled $[a_1, b_1]$, via one or more non-tree edges if and only if there is a link $i \rightarrow [j, k)$ in the transitive link table such that $i \in [a_1, b_1)$ and $a_2 \in [j, k)$. According to Definition 1, there are $N(a_1, a_2)$ links satisfying $i \geq a_1$ and $a_2 \in [j, k)$; among them, $N(b-i, a_2)$ links have $i \geq b_1$. Thus, there is at least one link that satisfies $i \in [a_1, b_1)$ and $a_2 \in [j, k)$ as long as $N(a_1, a_2) - N(b_1, b_2) > 0$.

As an example, consider the reachability between node u and node w in FIG. 2. Here, the two nodes are labeled [9,11) and [3,4) respectively. Because $N(9,3) - N(11,3) = 1 - 0 > 0$, thus we know w is reachable from u via some non-tree links.

Based on the above discussion, it is known that if $N(x,y)$ is computed and stored for any pair of x and y, then the reachability query can be answered in constant time. The cost of storing one particular $N(x, y)$ value is low, as the following property shows.

Property 2 (Size of a TLC Value). Any value of $N(\cdot, \cdot)$ can be stored in 2 log t bits.

Proof. According to Definition 1, $N(\cdot, \cdot)$ is the number of links in the transitive link table that satisfy a certain condition. Since there are no more than $t(t+1)/2$ transitive links, the range of $N(\cdot, \cdot)$ is $$\left[0, \frac{t(t+1)}{2}\right],$$

thus it requires no more than 2 log t bits to store each value. Unfortunately, if $N(\cdot, \cdot)$ is stored for each and every input pair that might be used for querying, the storage requirement would be prohibitive. This is because the interval labels use $\Theta(n)$ distinct numbers, meaning that the number of possible input pairs for $N(\cdot, \cdot)$ is $O(n^2)$, which is unacceptable for large graphs.

C. Space Reduction by Gridding and Snapping

To reduce the storage requirement of the TLC function, it is first observed that the function's value can change only at x coordinates where there is a vertical line segment, or at y coordinates where a vertical line segment begins or ends.

Figure 4:
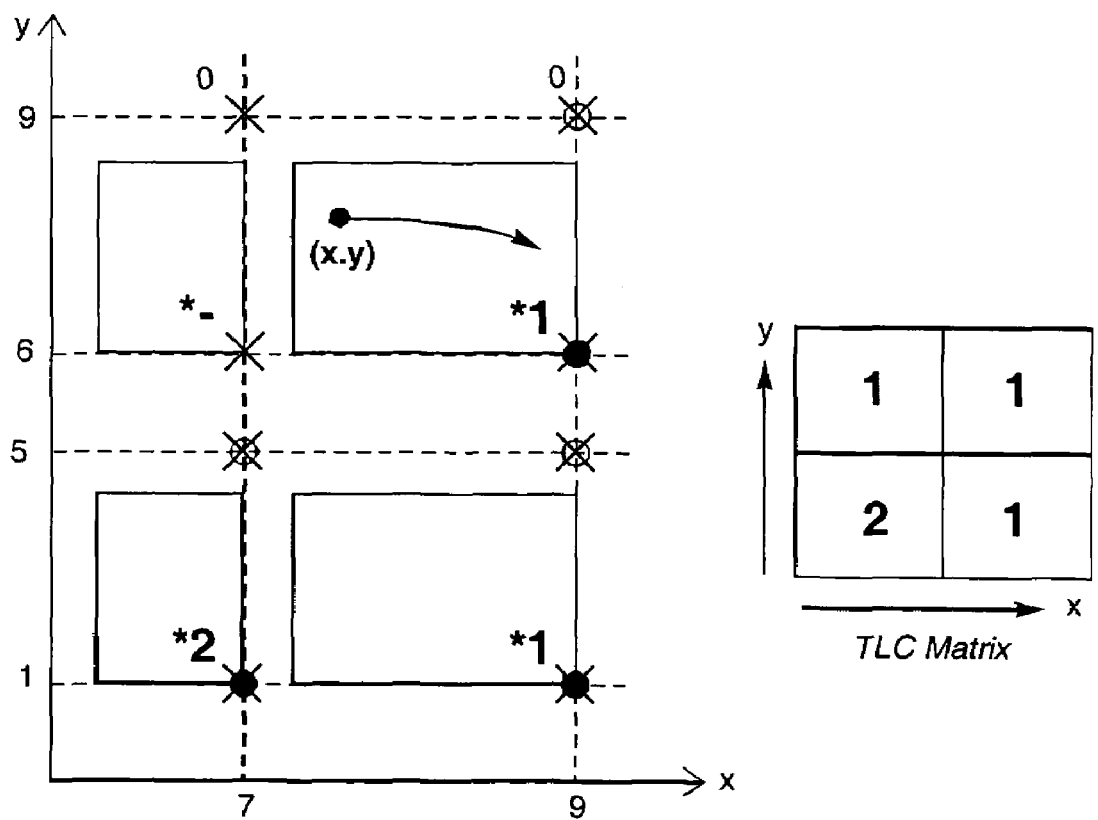
FIG. 4 is a diagram illustrating how the storage requirement of the transitive link table can be reduced by intelligent snapping to a grid according to an embodiment of the present invention.

Intuitively, the two-dimensional space can be though of as being covered by a grid of cells. FIG. 4 shows a grid corresponding to the example graph in FIG. 2. From Definition 1, it should be clear that for each grid cell, the value of the TLC function remains constant throughout the interior of the cell as well as its lower and right boundaries. Therefore, the value at the lower-right corner point can be stored as the representative for the entire cell (cells to the far right do not need any representatives because the TLC value in them is always 0). To look up the value of $N(x, y)$, we simply "snap" the point (x, y) to its representative grid point and retrieve the stored TLC value.

The storage requirement can be further reduced by more intelligent "snapping" that exploits the fact that all line segments come from interval labeling of a tree. Suppose reachability is checked from $[a_1, b_1)$ to $[a_2, b_2)$ through non-tree edges, which can be determined by computing $N(a_1, a_2) - N(b_1, a_2)$. The following lemma shows that $N(a_1, a_0) - N(b_1, a_0)$ can be computed instead, where $a_0$ is the start label of the lowest (tree) ancestor of $(a_2, b_2)$ that has a non-tree incoming edge. Intuitively, the only way for $[a_1, b_1)$ to reach $[a_2, b_2)$ is through this node. Using this lemma, $N(\cdot,\cdot)$ needs to be computed only for y coordinates that correspond to the lower ends of some vertical line segments. Therefore, the TLC values only need to be stored at the following grid points (at most $t^2$ of them):

$$\{i | i \rightarrow [j,k) \in T\} \times \{j | i \rightarrow [j,k) \in T\}.$$

Lemma 2. Consider any two nodes labeled $[a_1, b_1)$ and $[a_2, b_2)$ where $[a_2, b_2) \not\subseteq [a_1, b_1)$. Let $[a_0, b_0)$ be the label of the lowest (tree) ancestor of $[a_2, b_2)$ (or itself) with a non-tree incoming edge in the link table. If such a node exists, then $N(a_1, a_2) - N(b_1, a_2) = N(a_1, a_0) - N(b_1, a_0)$. If no such node exists, then $N(a_1, a_2) - N(b_1, a_2) = 0$.

Proof. In the case where no such node exists, clearly it is impossible for $[a_1, be)$ to reach $[a_2, b_2)$, so $N(a_1, a_2) - N(b_1, a_2) = 0$. The focus then falls on the case when $[a_0, b_0)$ exists. $N(a_1, a_2) - N(b_1, a_2)$ counts the number of vertical line segments intersecting $x \in [a_1, b_1)$, $y = a_2$. Thus, it suffices to prove that any vertical line segment intersecting $y = a_0$ must intersect $y = a_2$, and vice versa. For any vertical line segment $i \rightarrow [j, k)$ intersecting $y = a_0$, $[j, k)$ is an interval label containing $a_0$. Therefore, $[j, k)$ is an ancestor of $[a_0, b_0)$ and in turn must be an ancestor of $[a_2, b_2)$, which implies that $i \rightarrow [j, k)$ also intersects $y = a_2$. On the other hand, for any vertical line segment $i \rightarrow [j, k)$ intersecting $y = a_2$, $[j, k)$ contains $a_2$ and therefore is an ancestor of $[a_2, b_2)$. At the same time, the fact that $i \rightarrow [j, k) \in T$ implies that $[j, k)$ has a non-tree incoming edge. However, $[a_0, b_0)$ is the lowest ancestor of $[a_2, b_2)$ with a non-tree incoming edge. Therefore, $[j, k)$ must be an ancestor of $[a_0, b_0)$ or $[j, k) = [a_0, b_0)$; either way, $[j, k)$ intersects $y = a_0$.

To store the TLC values at necessary grid points, a TLC matrix N is used. $Index_x(i)$ denotes the position (starting from 0) of i within the set $\{i | i \rightarrow [j, k) \in T\}$ ordered by value, and similarly, let $index_y(j)$ denote the position of j within the ordered set $\{j | i \rightarrow [j, k) \in T\}$. We store the TLC value $N(i, j)$ at $N[index_x(i), index_y(i)]$. Clearly, N is at most a t×t matrix. The algorithm for constructing the TLC matrix is given as Algorithm 1.

D. Non-Tree Labeling

The following section describes how to assign non-tree labels to nodes, which enable reachability queries to be answered in constant time by using the TLC matrix N.

Definition 2 (Non-Tree Labels). Let u be a node with interval label $[a, b)$. The non-tree labels of u is a triple $\langle x, y, z \rangle$, where $x = index_x(a')$, where $a' = \min\{i | i \rightarrow [j, k) \in T \wedge i \geq a\}$. If such an $a'$ does not exist, let x be the special symbol "—."

$y = index_y(b')$, where $b' = \min\{i | i \rightarrow [j, k) \in T \wedge i \geq b\}$. If such a $b'$ does not exist, let y be "—."

The following is an exemplary section of code that, according to one embodiment of the present invention, defines a TLC matrix.

Algorithm 1: Build the TLC matrix.
ComputeTLCMatrix(G)

```
1: for each non-tree edge a → [b, c] in G do
2:     insert a into the ordered list X
3:     insert b into the ordered list Y
4: index_x (x) (index_y(y)) is the index of x; in X (y in Y)
5: initialize an |X| x |Y| matrix N
6: initialize a counter list C{y} = 0 for each y ∈ Y
7: x_c = max(x) in X
8: for each i → [j, k) ∈ T where T is decreasingly sorted by i do
9:     if i < x_c then
10:        for each y ∈ Y do
11:            N[index_x:(x_c), index_y(y)] = C(y)
12:        x_c = i
13:     for each y ∈ [j, k) do
14:        C(y) = C{y} + 1
15:     for each y ∈ Y do
16:        N[index_x (x_c), mdex_y{y}] = C(y)
```

$z = index_y(a^*)$, where $a^*$ is the start interval label of the lowest (tree) ancestor of u with a non-tree incoming edge. If such an $a^*$ does not exist, let z be "—."

Figure 5:
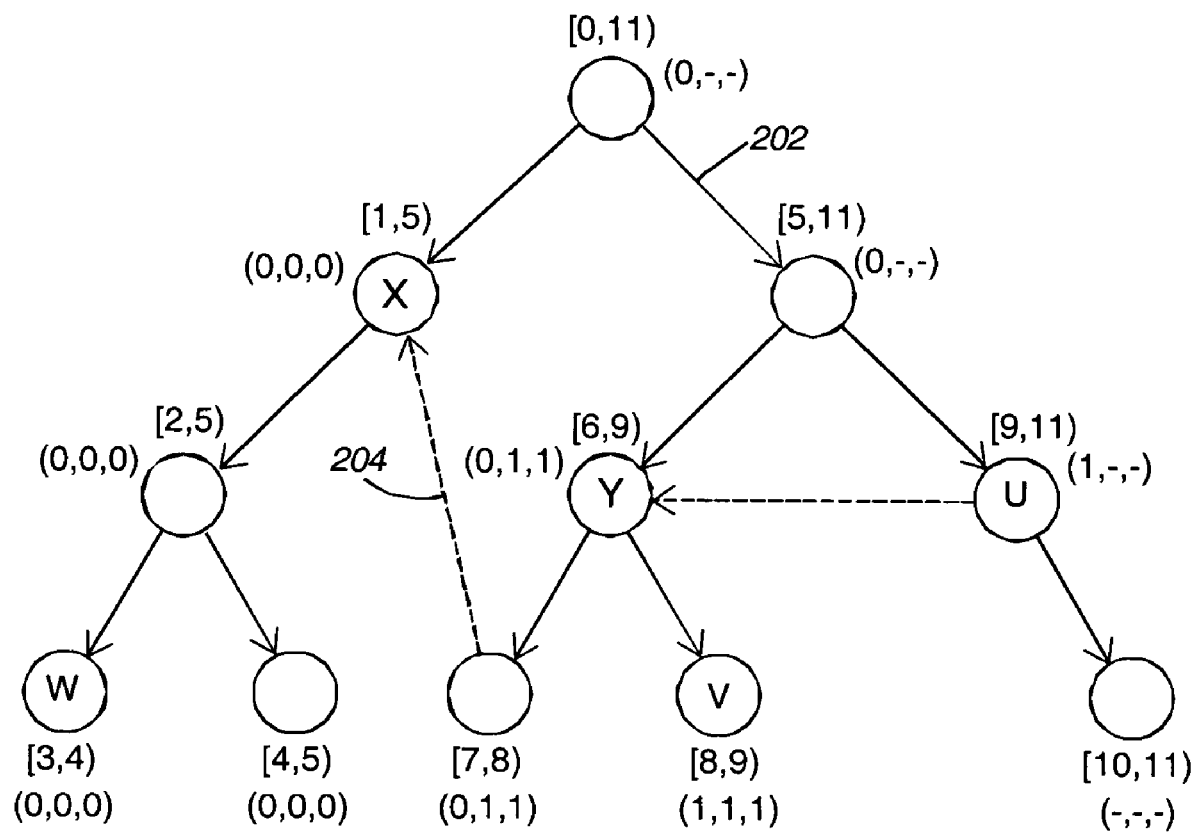
FIG. 5 is a diagram illustrating the spanning tree graph of FIG. 1 with both non-tree labels and interval-based labels according to an embodiment of the present invention.

FIG. 5 shows an example of the non-tree labels. For instance, the non-tree label of the root node is (0, —, —), because: (1) the root start label "snaps" to the first x-coordinate in the TLC grid; (2) the root end label lies beyond the last ^-coordinate and therefore "snaps" to —; and (3) the root has no ancestor with non-tree incoming edge. Similarly, the non-tree labels of nodes u and v are (1, —, —) and (1, 1, 1), respectively.

To assign non-tree labels, Algorithm 2 is used. Algorithm 2 basically traverses the spanning tree in a depth-first manner following the order of interval labels. The x component of the non-tree label is assigned when the traversal enters the node, and the y component is assigned when the traversal leaves the node. These labels are assigned in constant time by stepping through the ordered list of x-coordinates in the TLC grid in parallel. To assign the z component, a stack is used to keep track of the lowest ancestor with a non-tree incoming edge. Algorithm 2 has linear complexity. The process of creating the transitive link table, in the worst case, may take $O(t^3)$ steps, and Algorithm 1 $O(t^1)$ steps. Since t<<n, the labeling algorithm of the present invention is much more efficient than the prior-art 2-hop labeling, which has complexity $O(n^4)$, or the HOPI algorithm, which has complexity $O(n^3)$.

Algorithm 2: Non-Tree Labeling
AssignNonTreeLabel(G)

```
1: Stack ← {-}
2: X and Y are the same lists defined in Algorithm 1
3: append - to the end of X
4: i=0
5: for each root in G sorted by root.start do
6:    LABEL(root)
LABEL(n)
1: ix ← i
2: if n has an incoming link then
3:    Stack.push(index_y (n.start))
4: for each child c of n do
5:    LABEL(c)
6: if n.end > X(i) then
7:    i = i + 1
8: iy ← i
9: n'S non-tree label is <ix, iy, Stack.top( )>
10: if n has an incoming link then
11:    Stack.pop( )
```

The Dual-I labeling scheme is now complete. It is now possible to answer reachability queries in constant time with interval labels, non-tree labels, and the help of the TLC matrix N.

Theorem 3. Suppose two nodes u and v are labeled $([a_1, b_1), \langle x_1, y_1, z_1 \rangle)$ and $([a_2, b_2), \langle x_2, y_2, z_2 \rangle)$ respectively. Node v is reachable from node u if and only if:

$a_2 \in [a_1, b_1)$, or $N[x_1, z_2] - N[y_1, z_2] > 0$. (Let $N[x, —] = N[—, y] = 0$, $\forall x, y$.)

Proof. If v is reachable from u by tree edges, then we have $a_2 \in [a_1, b_1)$. Otherwise, the only way u can reach v is via non-tree edges. According to Theorem 2, v is reachable from u via some non-tree edge if $N(a_1, a_2)-N(b_1, a_2)>0$. The same symbols a', b' and a* as in Definition 2 are used. If it can be shown that $index_x(a_1) = index_x(a'_1) = x_1$,
$index_x(b_1) = index_x(b'_1) = y_1$,
$index_y(a_2) = index_y(a*_2) = z_2$, then the theorem is proved.

According to Definition 2, there is no link $i \rightarrow [j, k]$, such that $i \in [a_1, a'_1)$, which means $index_x\{a_1\} = index_x(a'_1)$. Similarly, $index_x\{b_1\} = index_x(b'_1)$. Since $a*_2$ is v's closest ancestor with an incoming link, there is no link $i \rightarrow [j, k)$ such that $j \in [a*_2, a_2)$, which means $index_y(a_2) = index_y(a*_2)$. Putting everything together, we have:

$$N[z_1, z_2] - N[y_1, z_2] = N(a_1, a_2) - N(b_1, a_2) > 0.$$

For example, in FIG. 5, the non-tree labels of node u and w are $(1, —, —)$ and $(0, 0, 0)$ respectively. Although u is not an ancestor of w in the spanning tree, w is reachable from u because $N[1, 0] - N[—, 0] = 1 > 0$.

III. Trading Off Time for Space

The Dual-I labeling scheme introduced above supports constant query time by using non-tree labels (totaling $O(n)$ space) and a TLC matrix ($O(t^2)$ space) in addition to interval labels. In this section, the Dual-II labeling scheme, which reduces the space requirement of the Dual-I scheme, is presented.

Figure 6:
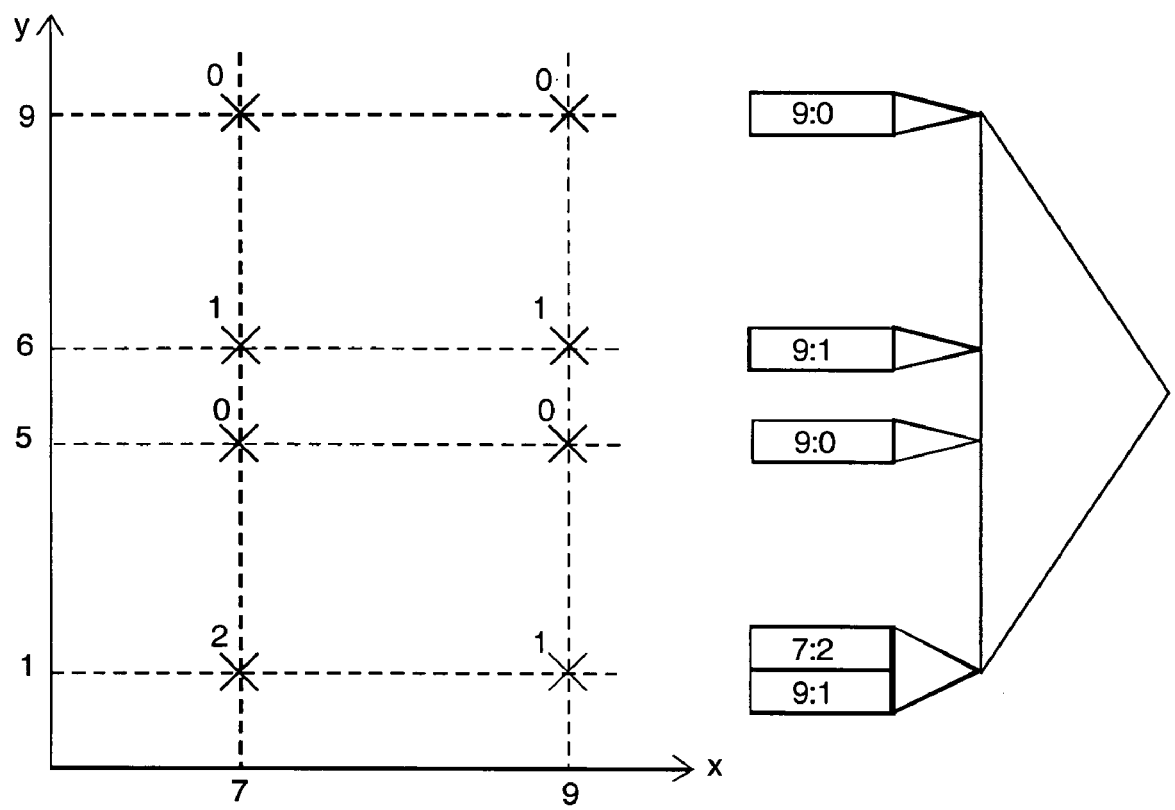
FIG. 6 is a flow diagram illustrating a transitive link count search tree according to one embodiment of the present invention.

In one embodiment, in order to avoid storing any non-tree labels, the present invention uses a TLC search tree as an alternative to the TLC matrix, so that the value of $N(x, y)$ for any input pair can be efficiently searched for without remembering which grid point $(x, y)$ snaps to. The TLC search tree has two layers. The lower layer consists of a sequence of mini-trees, each indexing a row of TLC grid points (with the same y coordinate) by their x coordinates, as shown in FIG. 6. Consecutive entries with identical TLC values do not need to be duplicated. The upper layer indexes the sequence of mini-trees by their y coordinates. To compute $N(x_o, y_o)$, first the upper layer is searched for a mini-tree with the largest $y \leq y_o$; then, the mini-tree is searched for the entry with the smallest $x \geq x_0$. The TLC value of the result entry is equal to $N(x_0, y_0)$. This computation take $0(\log t)$ time overall, because there are at most 2t mini-trees and each mini-tree has at most t entries. Although in the worst case the TLC search tree may index $2t^2$ entries and require $O(t^2)$ space, in practice it may take less space than the TLC matrix because of the optimization that collapses consecutive entries with identical TLC values in each row.

Figure 7:
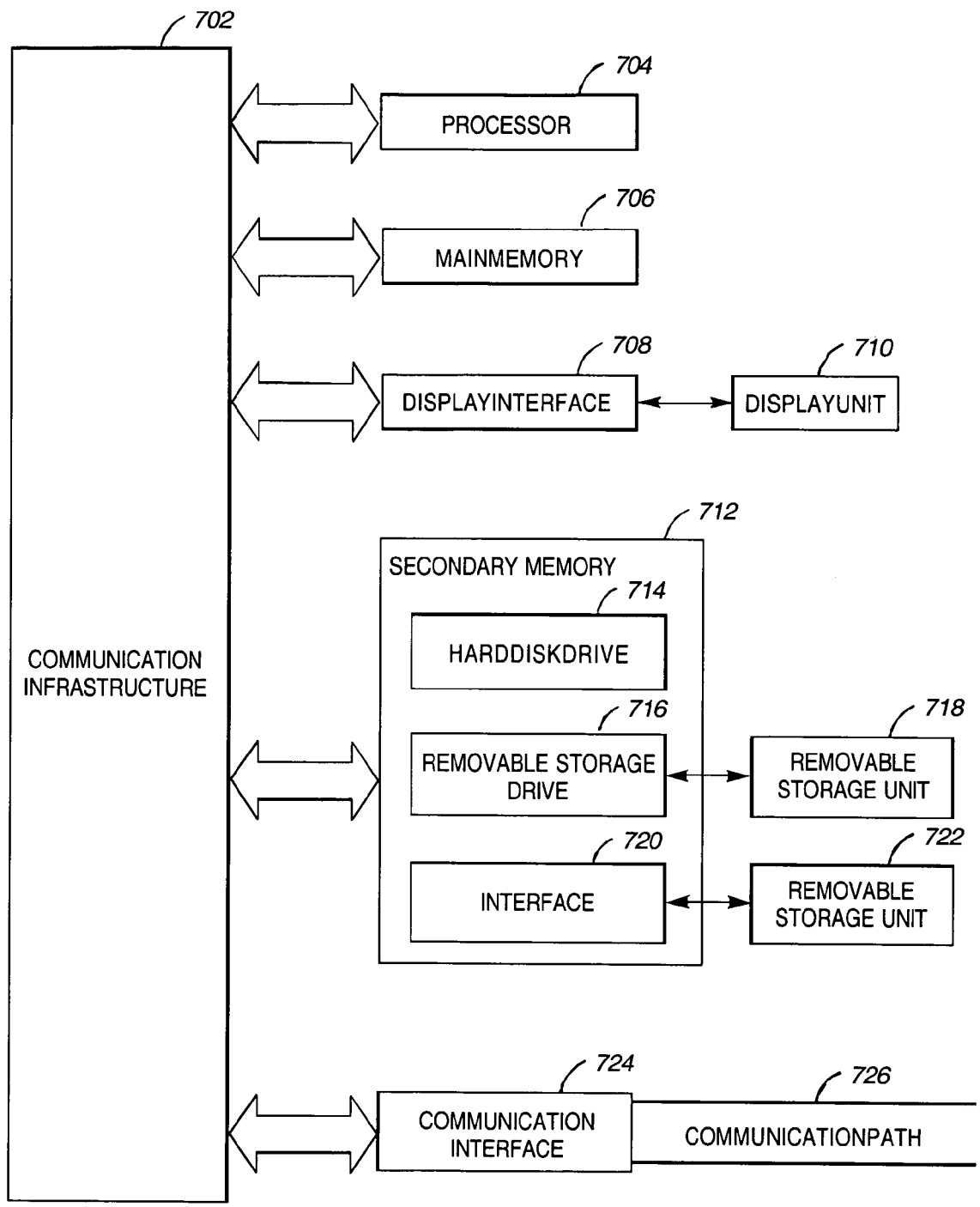
FIG. 7 is a block diagram of a computer system useful for implementing an embodiment of the present invention.

FIG. 7 is a block diagram of a computer system useful for implementing an embodiment of the present invention. The computer system includes one or more processors, such as processor 704. The processor 704 is connected to a communication infrastructure 702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 708 that forwards graphics, text, and other data from the communication infrastructure 702 (or from a frame buffer not shown) for display on the display unit 710. The computer system also includes a main memory 706, preferably random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. Removable storage unit 718, represents a floppy disk, magnetic tape, optical disk, etc. which is read by and written to by removable storage drive 716. As will be appreciated, the removable storage unit 718 includes a computer usable storage medium having stored therein computer software and/or data.

In alternative embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system may also include a communications interface 724. Communications interface 724 allows software and data to be transferred between the computer system and external devices. Examples of communications interface 724 may include a modem, a network interface (such as an Ethernet card), a communications port, a PCMCIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel) 726. This channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 706 and/or secondary memory 712. Computer programs may also be received via communications interface 724. Such computer programs, when executed, enable the computer system to perform the features of the present invention as discussed herein. In particular, the computer programs, when executed, enable the processor 704 to perform the features of the computer system. Accordingly, such computer programs represent controllers of the computer system.

Applications for the exemplary embodiment of the present invention include, for example, identification of reachability between nodes of an XML document. Based upon the above described processing, an XML processor is able to accept a query as to the reachability between two nodes of an XML document, and produce a result that indicates the reachability between a first node and second node of an XML document. Further applications include determining and producing results indicating reachability between nodes of an object oriented database or processing associated with genome biology.

Conclusion

Many applications involve massive, sparse graphs, yet require fast answering of graph reachability queries. State of the art reachability labeling schemes such as 2-hop have relatively efficient query performance, but have high complexity of indexing (labeling), which prevents them from being used on massive graphs. The present invention is a novel graph reachability labeling scheme called "dual labeling." The invention seamlessly integrates interval-based labels and non-tree labels, and achieves constant-time query processing (the Dual-I scheme). Furthermore, the labeling complexity of the present invention is close to linear for sparse graphs, which makes it applicable to massive datasets.

While preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for determining node reachability within a graph, wherein the method comprises:

performing a depth-first traversal of a graph to define unique interval labels for each respective node in the graph, wherein each interval-based label specifies a start and an end, where the start is the node's preorder number and the end is one less than the node's postorder number in the graph, assigning, after the performing, a respective unique interval-based label within the unique interval labels to each node within the graph, assigning a respective non-tree label to each node in the graph that is connected to another node in the graph by a non-tree link;

creating a link table of non-tree links, the link table listing each non-tree link between nodes in the graph;

creating a transitive closure of the link table, adding a link $i_1 \rightarrow [j_2, k_2)$ to a transitive link table if $i_2 \in [j_1, k_1)$ for any two links $i_1 \rightarrow [j_1, k_1)$ and $i_2 \rightarrow [j_2, k_2)$ in the link table;

reducing a number of entries in the transitive link table by removing transitive links that are not located at grid points that correspond to $\{i \mid i \rightarrow [j,k) \in T\} \times \{j \mid i \rightarrow [j,k) \in T\}$, where T is the transitive link table;

computing a transitive link counting function with a first parameter and a second parameter, the function specifying a number of specified links, wherein each respective specified link has:

a respective source node identifier greater than the first parameter; and a respective destination with a spanning range encompassing the second parameter;

determining that the first node is reachable from the second node by determining if the difference between a first transitive link counting function with a first parameter pair and a second transitive link counting function with a second parameter pair is greater than zero, wherein a first parameter of the first parameter pair is set to a preorder of the first node, a first parameter of the second parameter pair is set to the adjusted post order of the first node and the second parameter of the first parameter pair and the second parameter of the second parameter pair is set to a preorder of the second node; and providing, based at least in part on data within the link table, an output indicating reachability through a non-tree link from a first node to a second node within the graph based at least in part on data contained in the non-tree labels.

* * * * *